April 30, 1968 R. S. KIRWIN 3,380,200
DRILL GRINDING MACHINE
Filed Oct. 12, 1964 2 Sheets-Sheet 2
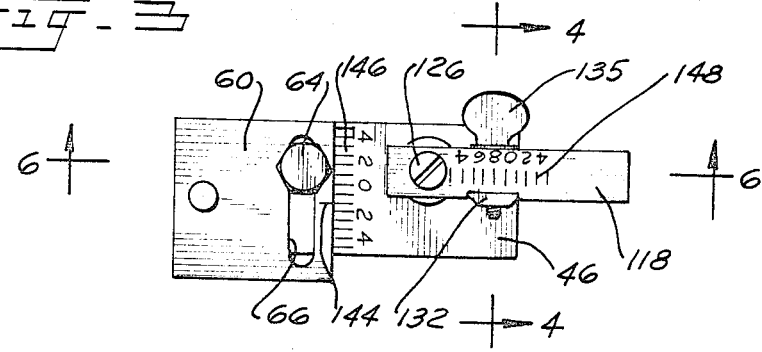
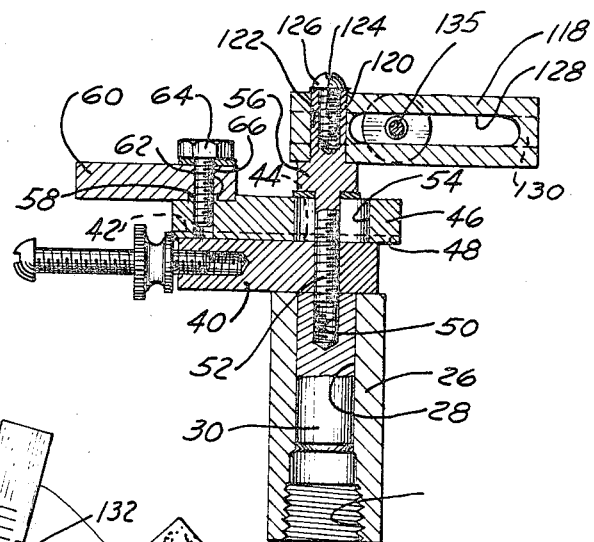
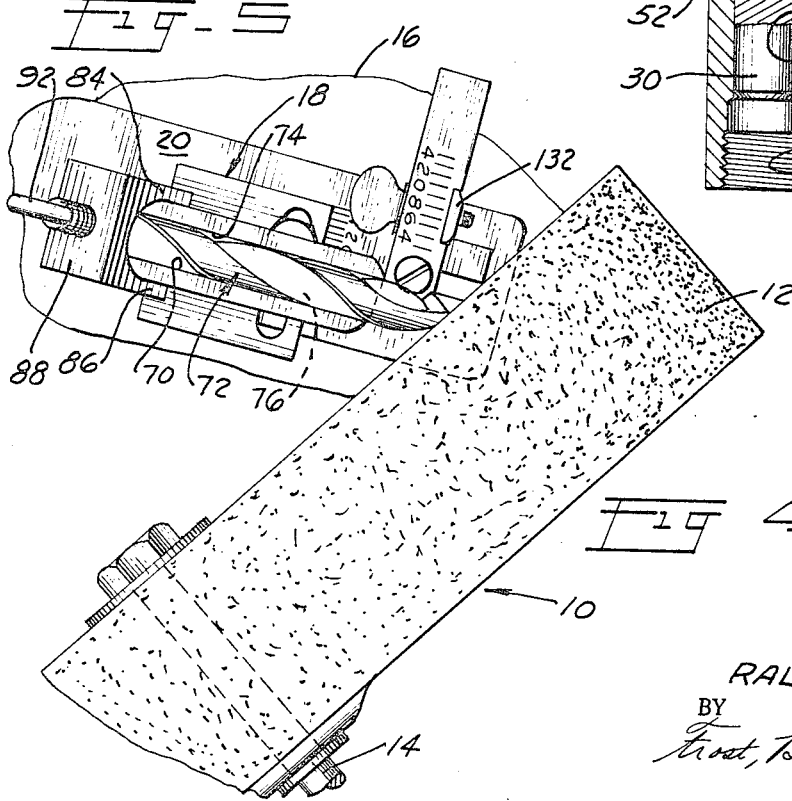
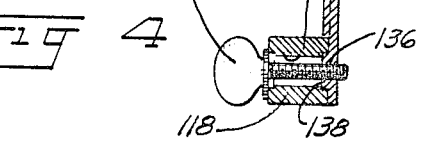
INVENTOR.
RALPH S. KIRWIN
BY
Frost, Burmeister & Kulie
ATTORNEYS

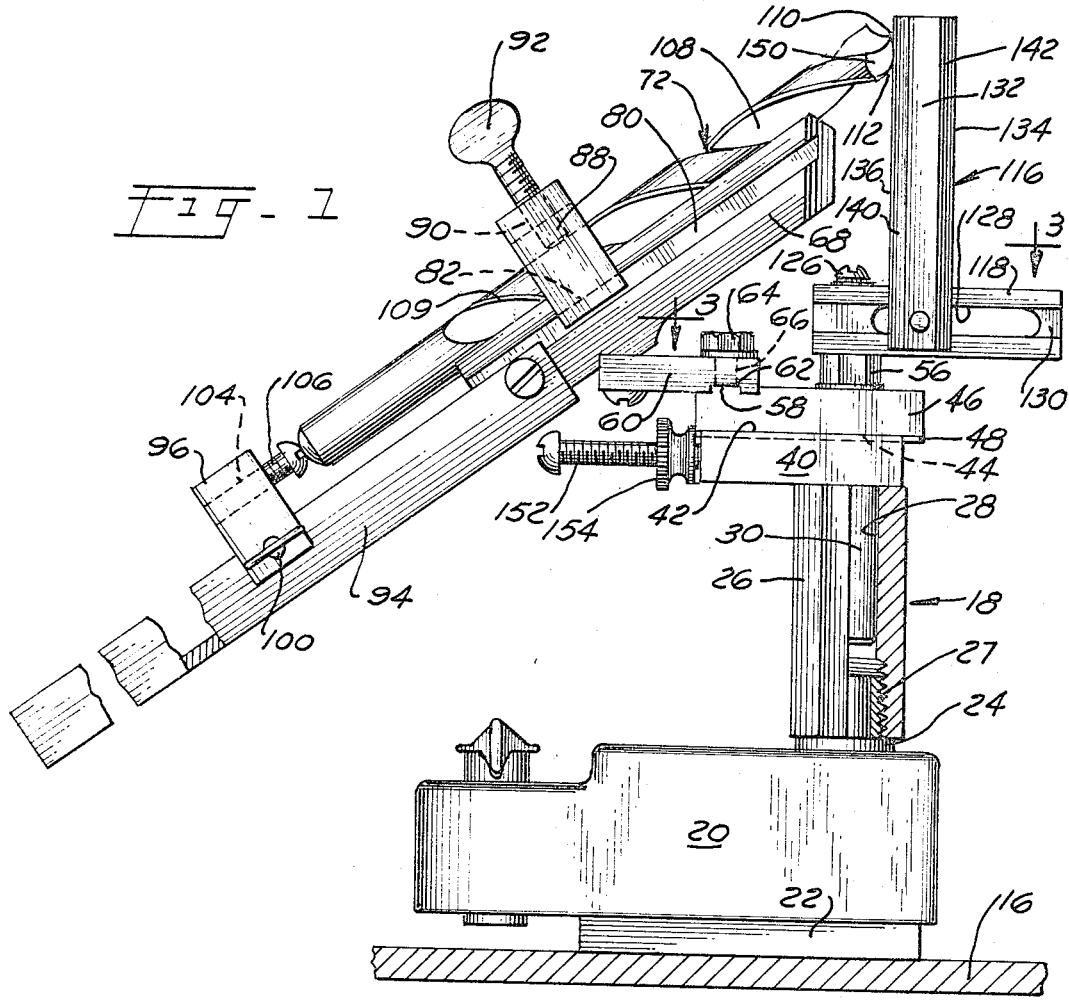
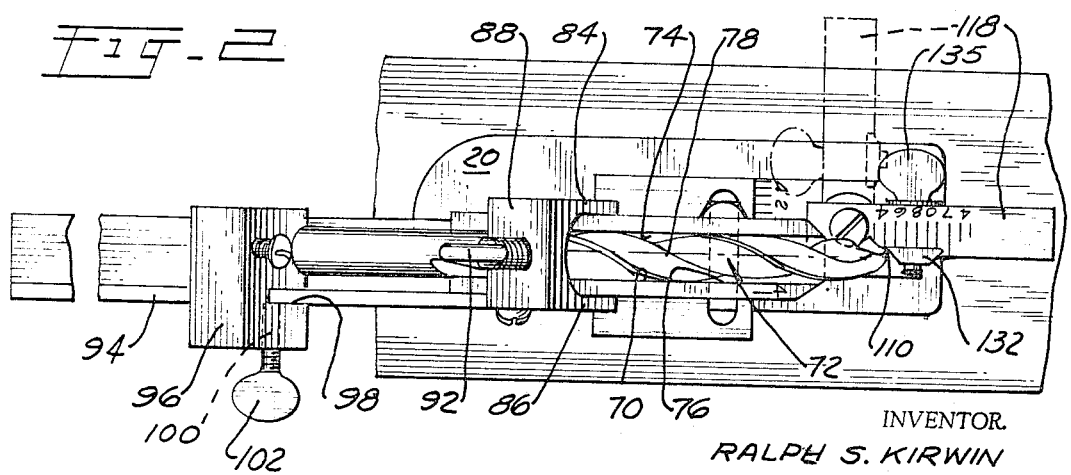

United States Patent Office 3,380,200
Patented Apr. 30, 1968

3,380,200
DRILL GRINDING MACHINE
Ralph S. Kirwin, 10 Gates St.,
Crystal Lake, Ill. 60014
Filed Oct. 12, 1964, Ser. No. 403,189
15 Claims. (Cl. 51—124)

The present invention relates to machines for grinding the cutting surfaces of a drill.

Drills suitable for boring metals and other hard materials must be initially ground when manufactured and shortly thereafter lose their sharpness and require regrinding. The present invention is directed to a machine for accomplishing this purpose, and also to a holder for a drill which will permit the drill to be sharpened against the flat side of a rotating abrasive wheel.

Prior to the present invention, drill sharpeners have either been costly or inaccurate. The costly drill grinders which have been used heretofore have generally gripped a drill in a collet and employed a precise and expensive mechanism for orienting the drill relative to a rotating abrasive wheel in order to shape the drill. Each drill size requires its own collet. Inexpensive drill sharpeners have generally failed to grind the drill symmetrically, so that the chisel edge of the drill invariably has been distorted and the drill has been damaged.

It is an object of the present invention to provide an inexpensive device for sharpening drills which is accurate and which may readily be used to obtain a properly sharpened drill.

It is also an object of the present invention to provide a holder for a drill which will permit a drill to be sharpened on an abrasive wheel with an accuracy substantially greater than that of prior drill holders for accomplishing this purpose.

In addition, it is an object of the present invention to provide an inexpensive drill sharpener which permits the lip clearance to be within the control of the operator.

These and further objects of the present invention will be more fully appreciated from a further consideration of this specification, particularly when viewed in the light of the drawings, in which:

FIGURE 1 is a front elevational view of a holder for a drill which facilitates sharpening of the drill;

FIGURE 2 is a plan view of the holder of FIGURE 1;

FIGURE 3 is a sectional view taken along the line 3—3 of FIGURE 1;

FIGURE 4 is a sectional view taken along the line 4—4 of FIGURE 3;

FIGURE 5 is a plan view of a drill sharpener employing the drill holder of FIGURES 1 through 4; and FIGURE 6 is a sectional view taken along the line 6—6 of FIGURE 3.

The figures illustrate a preferred construction of a drill sharpener constructed according to the present invention. The drill sharpener utilizes a conventional grinder generally designated 10 which employs a rotating abrasive wheel 12 mounted at its center on a shaft 14. The grinder 10 has a steel flat table 16, and a drill holder 18 is mounted on the table 16. The table 16 is a part of the support structure of the wheel grinder 10 for the rotable abrasive wheel 12, and it is to be understood that the drill holder 18 may be mounted in any conventional way on the support structure for the abrasive wheel 12 provided the drill to be ground or sharpened is properly positioned relative to the abrasive wheel 12. In the embodiment of the invention illustrated in the figures, the drill holder 18 is mounted on the support structure for the abrasive wheel 12 by means of a magnetic base 20 which maintains a fixed position on the table 16 as a result of magnetic attraction between the poles 22 of a permanent magnet circuit and the table 16.

The base 20 has a protruding threaded connector 24 which extends normally from the flat surface of the table 16, and engages a threaded socket 27 of a straight spindle 26 which is disposed normal to the surface of the table 16. The spindle 26 has a straight cylindrical channel 28 extending therein from the side of the spindle remote from the socket 27, and a cylindrical pin 30 is rotatably disposed within the channel 28.

The drill holder 18 has a quadrangular block 40 with one surface mounted on the end of the pin 30 remote from the base 20, and normal to the axis of the pin 30. The opposite surface of the block 40, designated 42, has a straight elongated slot 44 extending therethrough parallel to the longitudinal axis of the block 40. The block 40 forms a guideway for a plate-shaped keyway 46 which is slidably disposed in abutment with the surface 42 of the block 40. The keyway 46 has a linear rib 48 disposed within the slot 44 of the block 40 and guided thereby. The pin 30 is integral with the block 40, and an axial bore 50 extends into the pin 30 and through the block 40. The axial bore 50 is threaded and receives the threaded end of a bolt 52. The bolt 52 passes through an elongated slot 54 in the keyway 46, the slot 54 being parallel to the rib 48 and aligned therewith. A hexagonal protruding portion 56 of the bolt 52 abuts the surface of the keyway 46 remote from the block 40, and the hexagonal portion may be engaged by a wrench to lock the keyway 46 in position on the block 40 or to permit the keyway 46 to slide on the block 40 within the limits of the slot 54.

The keyway 46 is also provided with a protruding rib 58 disposed on the surface remote from the block 40 normal to the rib 54. A guide plate 60 is provided with a linear groove 62 slidably accommodating the rib 58. A bolt 64 extends through a slot 66 which is disposed parallel to the groove 62 to permit the guide plate 60 to be translated relative to the keyway 46, and the bolt 64 is threadedly engaging the keyway 46.

The guide plate 60 has a trough member 68 mounted thereon, and the trough member 68 defines a V-shaped trough 70 which is linear and adapted to receive a drill, the drill being illustrated at 72 in the figures. The trough 70 has two flat surfaces 74 and 76 disposed of opposite sides thereof, and the surfaces 74 and 76 intersect in a line 78. which may be considered a drill alignment axis. The line 78 is parallel to the axis of a drill mounted on the trough 68, and is disposed at an obtuse angle to the axis of the pin 30. As will be more apparent hereinafter, the angle between the line 78 and the axis of the pin determines the included angle of the drill, and since the included angle of standard drills in 118°, the angle between the line 78 of the trough 68 and the axis of the pin 30 is preferably 118°.

The trough member 68 is provided with a linear elongated groove 80 on each side thereof parallel to the line 78, and inwardly protruding edges 82 from the ends of a pair of legs 84 and 86 of a U-shaped clamp 88 are slidably disposed within the grooves 80. The U-shaped clamp is provided with a threaded bore 90 extending therethrough normal to and aligned with the line 78, and a threaded set screw 92 engages the threaded bore 90 to abut and secure the drill 72 in position. An elongated angle member 94 is mounted on the trough member 68 and extends therefrom in parallel with the line 78. A drill-stop formed by a quadrangular block 96 and provided with a slot 98 disposed about the angle member 94 is translatably disposed on the angle member 94. The block 96 is provided with a bore 100 confronting the angle member 94, and a locking set screw 102 threadedly engages the bore 100 to lock the block 96 on the angle member 94. A bore 104 extends through the block 96 in alignment with the axis of the drill 72, and a threaded bolt 106 disposed within the bore 104 and engages the end of the drill 72.

Conventional drills, such as the drill 72, have two spiral grooves 108 disposed on opposite side of the drill and forming a web between the grooves 108. Also, only the protruding narrow strips adjacent the grooves, called the ground land 109 are ground to a cylindrical surface, and these ground lands alone abut the trough 70. The sharpened end of the drill results in a chisel edge 110 formed on the end of the web of the drill, and the leading edge of each groove, called the cutting lip 112 is on a straight line, the drill must be properly oriented relative to the flat surface of the grinding wheel 12. Orientation of the cutting lip 112 is greatly facilitated by means of a guide 116.

The guide 116 has a slotted bar 118 which is pivotally mounted about an extension 120 of the bolt 52, the extension 120 being rotatably disposed within a bore 122 extending through the bar 118 normal to the longitudinal axis thereof. The extension 120 of the bolt 52 is also provided with a threaded bore 124 and a bolt 126 engages the threads of the bore 124 to pivotally secure the bar 118 unto the bolt 52. The bar 118 has an elongated slot 128 disposed along its axis of elongation, and both sides of the bar 118 are provided with an elongated recess 130 aligned with the slot 128.

A drill alignment gauge in the form of an elongated plate 132 is removably mounted on the bar 118 on one side thereof or the other, and the plate 132 has a pair of parallel edges 134 and 136 which are disposed parallel to the axis of the pin 30. The plate 132 is mounted on the bar 118 by means of a set screw 135 which extends through the slot 128 and threadedly engages an aperture 136 in the plate 132. The plate is maintained normal to the axis of the slot 128 by means of a protruding rib 138 which is slidably disposed within one of the elongated recesses 130 on the sides of the bar 118. The plate 132 may be mounted in abutment with either side of the bar 118, by removing the set screw 134, moving the plate 132 and reinserting the set screw 134.

The rib 138 makes certain that the edges 134 and 136 will be perpendicular to the longitudinal axis of the bar 118, and hence parallel to the axis of the pin 30. Also, the edges of the plate 132 adjacent to the side thereof remote from the bar 118 are provided with flat surfaces 140 and 142 which taper toward the side of the plate 132 adjacent to the bar 118. The cutting lip 112 of the drill 72 may thus be positioned in abutment with the flat surface 140 of the plate 132.

Having described the principal elements of the drill sharpener, it will now be helpful for a complete understanding of the invention to consider the manner in which a drill is ground or sharpened. In the embodiment of the invention set forth in the figures, a right-handed drill is positioned for grinding, that is, the drill is positioned to the right of the axis of the pin 30 and the gauge or plate 132 is positioned on the right side of the bar 118 as viewed in plain view. Before the drill is locked in place on the trough member 68, the trough member is displaced to the right of the axis of the pin a distance equal to one-half the diameter of the drill, that is, the line 78 of the trough member is disposed in a plane parallel to the axis of the pin 30 which is spaced from the axis of the pin 30 by a distance equal to one-half the diameter of the drill. For this purpose, the guide plate 60 is provided with a central index mark 144, and the keyway 46 is provided with a scale 146 measuring displacement on both sides of a zero line, as illustrated in FIGURE 3.

The drill 72 is also advanced on a trough member 68 so that the cutting lip 112 is disposed on a plane parallel to the axis of the pin 30 and perpendicular to the longitudinal axis of the block 40 and located 1½ times the diameter of the drill ahead of the axis of the pin 30. For that purpose, a scale 148 is disposed on the upper surface of the bar 118 measuring the distance from the axis of the pin 30. The edge 136 of the gage 132 or plate is positioned adjacent to the desired distance as indicated in the scale 148.

It is also necessary that the cutting lip 112 of the drill 72 be disposed along an axis parallel to the axis of the pin 30. This cannot be readily accomplished with a gage with a flat surface, since a surface parallel to the plane passing through the line 72 of the trough member 68 parallel to the axis of the pin 30 will abut the trailing edge of the groove 108 which forms the cutting lip 112. For this reason, the flat surface 140 which is disposed at an acute angle to the plane parallel to the axis of the pin 30 and passing through the line 78 of the trough member 68 facilitates proper orientation of the cutting lip 112 on an axis parallel to the axis of the pin 30. In practice, the surfaces 140 and 142 are disposed at an angle of approximately 30° to the surface of the gage or plate 132 extending therebetween.

When the drill is thus positioned, it is ready to be brought into contact with the flat surface of the abrasive wheel 12 which is maintained in constant rotation about the axis of the shaft 14. The trough member 68 is thereupon rotated about the axis of the pin 30 to form a cutting lip surface, designated 150. If the drill is badly worn, and the drill must be advanced relative to the abrasive wheel 12 in order to complete sharpening of the drill, the drill may be advanced without being released from the trough member 68. In order to advance the drill, a wrench is utilized to engage the hexagonal portion 56 of the bolt 52 in order to release the friction between the block 40 and the keyway 46. A threaded bolt 152 is mounted on the block 40 along the axis of the elongation thereof, and a knurled nut 154 is threadedly disposed about the bolt 152. The knurled nut 154 may be advanced to abut the confronting surface of the keyway 46 to urge the keyway 46 to move in the slot 54 thereof, thereby advancing the trough member 68 relative to the axis of the pin 30. The drill 72 may thereupon once again be sharpened by engagement with the abrasive wheel 12 by means of rotating the trough member 68 about the axis of the pin 30.

It is to be noted that the gauge 132 and bar 118 are pivotally mounted on the extension 120 of the bolt 52. As is indicated by dash lines in FIGURE 2 and in FIGURE 5, the entire assembly of bar 118 and gauge 132 are rotated to a position essentially normal to the vertical plane of the drill 72 so that the drill may engage the surface of the abrasive wheel 12. In this manner, it is not necessary to remove the base 20 from the table 16 of the grinder 10 in order to properly position the drill or the drill holder 18, but the drill may be positioned while maintaining the drill holder 18 in proximity to the abrasive wheel 12.

When the drill 72 is positioned as indicated above, that is, with the edge of the cutting lip disposed 1½ times the diameter of the drill ahead of the axis of the pin 30 and with a right-hand drill displaced half the diameter of the drill to the right of the axis of the pin 30, the cutting lip surface 150 will be the conventional surface, that is, the lip clearance will be conventional. The lip clearance may be defined as the distance between the plane of the chisel edge 110 normal to the axis of the drill and the plane normal to the axis of the drill passing through the edge of the cutting lip surface 150 remote from the chisel edge 110. The greater the lip clearance, the faster the drill will pass through a work piece under a given set of conditions, and the lip clearance may be controlled with the present drill grinder since the lip clearance will be increased by either increasing the advance of the chisel edge 110 ahead of the axis of the pin 30 or increasing the displacement of the vertical plane passing through the axis of the drill from the axis of the pin 30. In other words, the lip clearance can be increased by positioning the edge 136 of the guide 132 less than 1½ times the diameter of the drill or increasing the displacement of the guide plate 60 from the position of the block 40 more than half the diameter of the drill, or both. If it is desired to reduce the speed with which a drill will pass through a work piece, a "no hog" drill may be achieved by increasing the distance between the axis of the pin 30 and the chisel edge 110 of the drill to more than 1½ times the diameter of the drill or reducing the displacement of the drill from the axis of the pin 30 to less than half of the diameter of the drill.

Once the cutting lip surface 150 has been ground to satisfaction, the drill 72 is loosened in the clamp 88, turned over, and the other cutting lip is aligned parallel to the axis of the pin 30 so that the opposite cutting lip surface may also be ground in an identical manner to the cutting lip surface 150.

If a left-handed drill is employed, the guide block 60 is displaced half the diameter of the drill to the left of the zero marker of the scale 146 and the guide 132 is position on the opposite side of the bar 118 from that illustrated. The edge 134 of the guide 132 is used to position the cutting lip parallel to the axis of the pin 30 and 1½ times the diameter of the drill ahead of the axis of the pin 30.

From the foregoing specification, those skilled in the art will readily devise many uses for the present invention beyond that here specified. Further, modifications may be made of the drill grinder herein described within the framework of the present invention. It is therefore intended that the scope of the present invention be not limited by the foregoing specification, but rather only by the appended claims.

The invention claimed is:

1. A drill sharpener comprising, in combination: an abrasive wheel having a flat surface; means for mounting the abrasive wheel for rotation about an axis normal to the flat surface; a releasable drill clamp having a drill alignment axis for securing a drill in a fixed position on said clamp with the longitudinal axis of the drill parallel to the drill alignment axis and the cutting end of the drill exposed for grinding; a support structure disposed between the releasable clamp and the means for mounting the abrasive wheel for positioning the drill clamp relative to the wheel, said support structure having a first part mounted on the means for mounting the abrasive wheel and a second part mounted on the drill clamp and pivotally mounted on the first part for rotation about an axis parallel to the flat surface of the wheel, the drill alignment axis of the clamp being disposed at an acute angle to a first plane containing the pivotal axis and the first plane being normal to a second plane, said second plane containing the drill alignment axis of the clamp and being parallel to the pivotal axis, said support structure including adjustable means for positioning the drill alignment axis of the clamp relative to the pivotal axis by adjusting said drill clamp and said pivotal axis while maintaining the relation of said elements.

2. A drill sharpener comprising the combination of claim 1, in combination with a gauge comprising a plate having a straight edge and an arm mounted on the second part of the support structure for rotation about the pivotal axis, the plate being mounted on the arm with the straight edge parallel to the pivotal axis and spaced therefrom.

3. A drill sharpener comprising the combination of claim 1, in combination with a gauge comprising a plate having a pair of straight edges disposed on opposite sides thereof and an arm mounted on the second part of the support structure for rotation about the pivotal axis, the arm having a central axis extending outwardly from the pivotal axis, and a pair of opposite sides parallel to the pivotal axis, the plate being removably mounted on either of the sides of the arm with the straight edges parallel with the pivotal axis and spaced therefrom, and the plate having a pair of flat surfaces disposed at an acute angle to the plane passing through the pivotal axis on the central axis of the arm, said flat surfaces extending from the edges and passing through said edges, respectively.

4. A drill sharpener comprising the combination of claim 2 wherein the arm of the gauge extends normally from the pivotal axis and is provided with a linear recess on a side thereof, the plate being provided with an elongated ridge slidably disposed in the recess of the arm.

5. A drill sharpener comprising the combination of claim 4 wherein the arm of the gauge is provided with an elongated slot extending therethrough, said slot being aligned with the recess thereof and the axis of elongation thereof being aligned with the recess, the plate having a threaded bore extending into the ridge thereof, and a set screw extending through the slot having a shoulder abutting the side opposite the plate, said set screw threadedly engaging the threaded bore.

6. A drill sharpener comprising the combination of claim 2 wherein the releasable drill clamp comprises a trough member having a pair of flat surfaces disposed at an angle to each other and intersecting in a straight line, and means for securing the drill to be sharpened in abutment with the trough member.

7. A drill sharpener comprising the combination of claim 6 wherein the means for securing the drill on the trough member comprises a U-shaped clamp formed by a pair of legs and an interconnecting yoke, each of said legs having an inwardly protruding rib, the trough member having a pair of linear grooves on opposite sides thereof parallel to the straight line of the trough member, and the ribs of the clamp member being slidable in the grooves, said yoke having a threaded bore extending therethrough, and a set screw threadedly engaging the bore of the yoke and adapted to abut a drill.

8. A drill sharpener comprising the combination of claim 6 wherein the support structure comprises a first part having a sleeve mounted on the grinder with a central axis parallel to the flat surface of the abrasive wheel, and a second part having a pin rotatably disposed in the sleeve and extending therefrom, a block having a pair of parallel flat surfaces disposed normal to the pin mounted on the pin, a keyway having a flat surface slidably abutting one of the flat surfaces of the block, said keyway being keyed for movement relative to the block along a straight line passing through the pivotal axis, and means for mounting the trough member on the keyway.

9. A drill sharpener comprising the combination of claim 8 wherein the keyway is provided with a second flat surface parallel to the first flat surface and the means for mounting the trough member on the keyway comprises a plate having a flat surface slidably mounted on the second surface of the keyway, said plate being keyed for movement along a straight line normal to the direction of movement between the block and keyway, and the trough member being mounted on the plate and at an acute angle thereto.

10. A drill sharpening attachment for grinders having an abrasive wheel with a flat surface and means to rotate the abrasive wheel about an axis normal to the flat surface comprising, in combination: a releasable drill clamp having a drill alignment axis for securing a drill in a fixed position on said clamp with the longitudinal axis of the drill parallel to the drill alignment axis and the cutting end of the drill exposed for grinding; a support structure adapted to be mounted on the grinder and support the drill clamp thereon for positioning the drill clamp relative to the abrasive wheel, said support structure having a first part adapted to engage the grinder and a second part mounted on the drill clamp and pivotly mounted on the first part for rotation about an axis adapted to be disposed parallel to the flat surface of the wheel, the drill alignment axis of the clamp being disposed at an acute angle to a first plane containing the pivotal axis and the first plane being normal to a second plane, said second plane containing the drill alignment axis of the clamp and being disposed parallel to the pivotal axis, said support structure including adjustable means for positioning the drill alignment axis of the clamp relative to the pivotal axis by adjusting the distance between said drill clamp and said pivotal axis while maintaining the relation of said elements.

11. A drill sharpening attachment for grinders having an abrasive wheel with a flat surface and means to rotate the abrasive wheel about an axis normal to the flat surface comprising the combination of claim 10, in combination with a gauge comprising a plate having a straight edge and an arm mounted on the second part of the support structure for rotation about the pivotal axis, the plate being mounted on the arm with the straight edge parallel with the pivotal axis and spaced therefrom.

12. A drill sharpening attachment for grinders having an abrasive wheel with a flat surface and means to rotate the abrasive wheel about an axis normal to the flat surface comprising the combination of claim 10, in combination with a gauge comprising a plate having a pair of straight edges disposed on opposite sides thereof and an arm mounted on the second part of the support structure for rotation about the pivotal axis, the arm having a central axis extending outwardly from the pivotal axis, and a pair of opposite sides parallel to the pivotal axis, the plate being removably mounted on either of the sides of the arm with the straight edges parallel with the pivotal axis and spaced therefrom, and the plate having a pair of flat surfaces disposed at an acute angle to the plane passing through the pivotal axis on the central axis of the arm, said flat surfaces extending from the edges and passing through said edges, respectively.

13. A drill sharpening attachment for grinders having an abrasive wheel with a flat surface and means to rotate the abrasive wheel about an axis to the flat surface comprising the combination of claim 11 wherein the arm of the gauge extends normally from the pivotal axis and is provided with a linear recess on a side thereof, the plate being provided with an elongated ridge slidably disposed in the recess of the arm.

14. A drill sharpening attachment for grinders having an abrasive wheel with a flat surface and means to rotate the abrasive wheel about an axis to the flat surface comprising the combination of claim 13 wherein the arm of the gauge is provided with an elongated slot extending therethrough, said slot being aligned with the recess thereof and the axis of elongation thereof being aligned with the recess, the plate having a threaded bore extending into the ridge thereof, and a set screw extending through the slot having a shoulder abutting the side opposite the plate, said set screw threadedly engaging the threaded bore.

15. A drill sharpening attachment for grinders having an abrasive wheel with a flat surface and means to rotate the abrasive wheel about an axis to the flat surface comprising the combination of claim 14 wherein the releasable drill clamp comprises a trough member having a pair of flat surfaces disposed at an angle to each other and intersecting in a straight line, and means for securing the drill to be sharpened in abutment with the trough member.

References Cited

UNITED STATES PATENTS

| | | | |
|---|---|---|---|
| 630,536 | 8/1899 | Heald | 51—219 X |
| 1,195,248 | 8/1916 | Mallory | 51—219 |
| 2,313,641 | 3/1943 | Hoerst | 51—219 |
| 2,408,618 | 10/1946 | Fielding | 51—219 |
| 2,580,884 | 1/1952 | Bowman | 51—219 X |
| 2,583,159 | 1/1952 | Swanson | 51—219 |
| 2,454,472 | 11/1948 | Monkley | 51—124 X |

HAROLD D. WHITEHEAD, *Primary Examiner.*